Jan. 27, 1970        W. W. WARD        3,491,462
AUDIO-VISUAL TEACHING MACHINE
Filed March 6, 1967        5 Sheets-Sheet 1
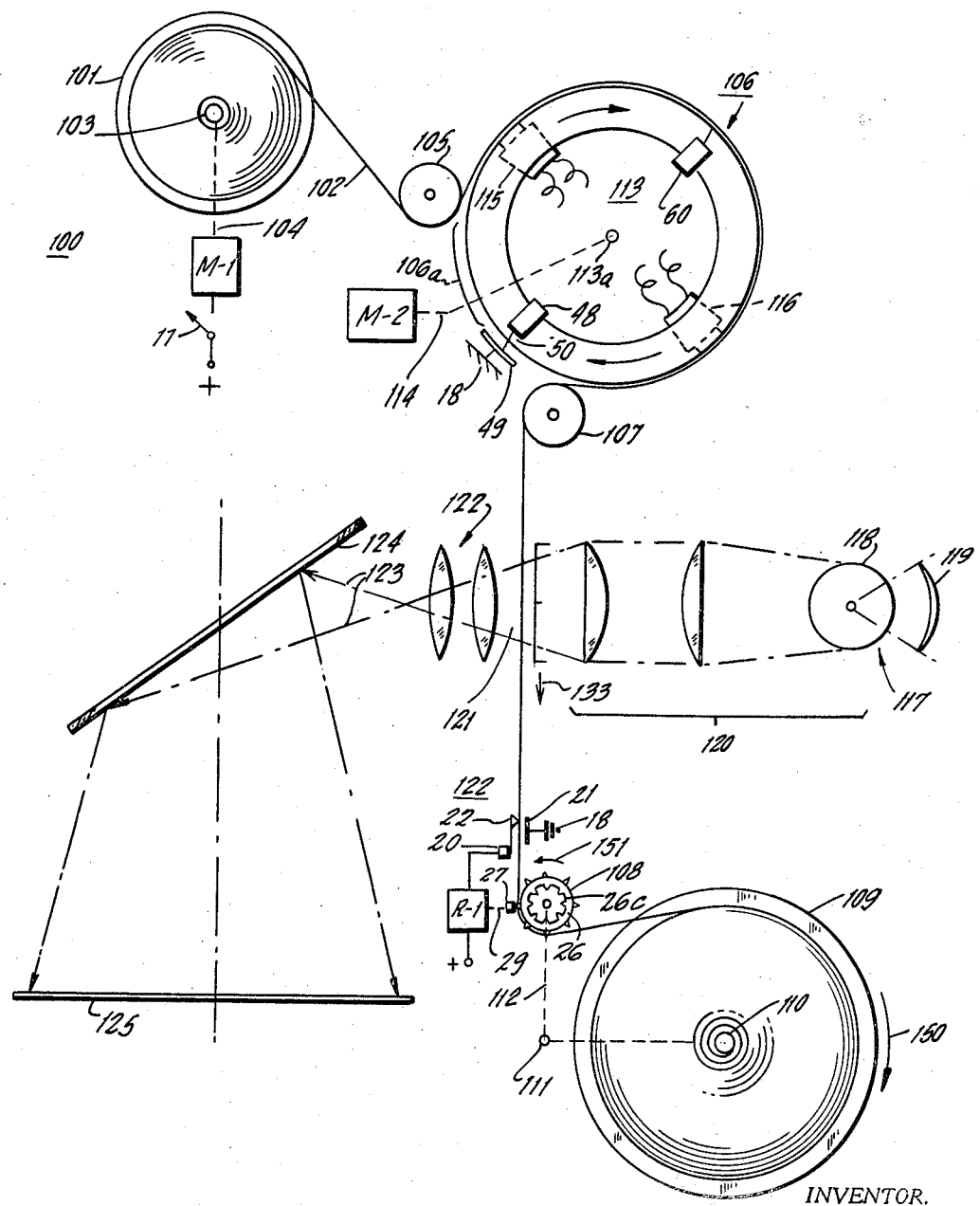
INVENTOR.
WALLACE W. WARD
BY
OSTROLENK, FABER, GERB & SOFFEN
ATTORNEYS Jan. 27, 1970  W. W. WARD  3,491,462
AUDIO-VISUAL TEACHING MACHINE
Filed March 6, 1967  5 Sheets-Sheet 2
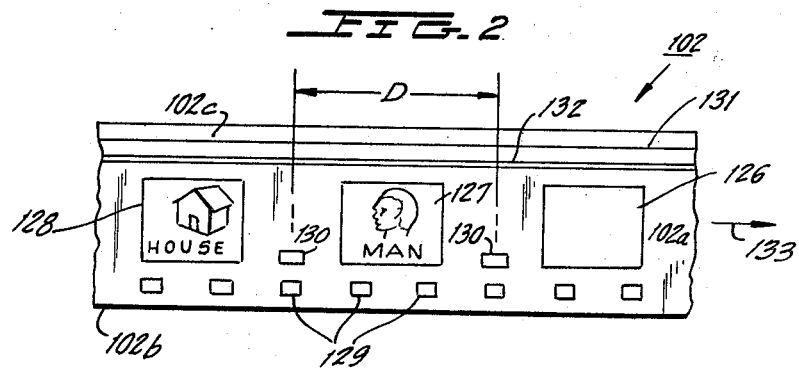
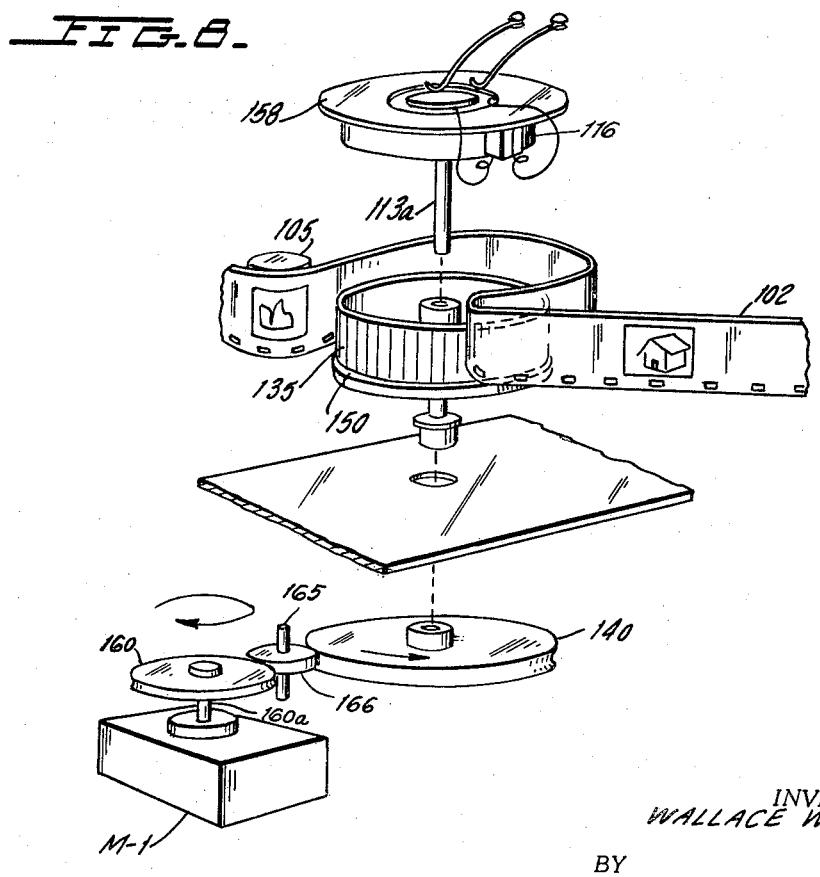
INVENTOR.
WALLACE W. WARD
BY
OSTROLENK, FABER, GERB & SOFFEN
ATTORNEYS Jan. 27, 1970 W. W. WARD 3,491,462
AUDIO-VISUAL TEACHING MACHINE
Filed March 6, 1967 5 Sheets-Sheet 3
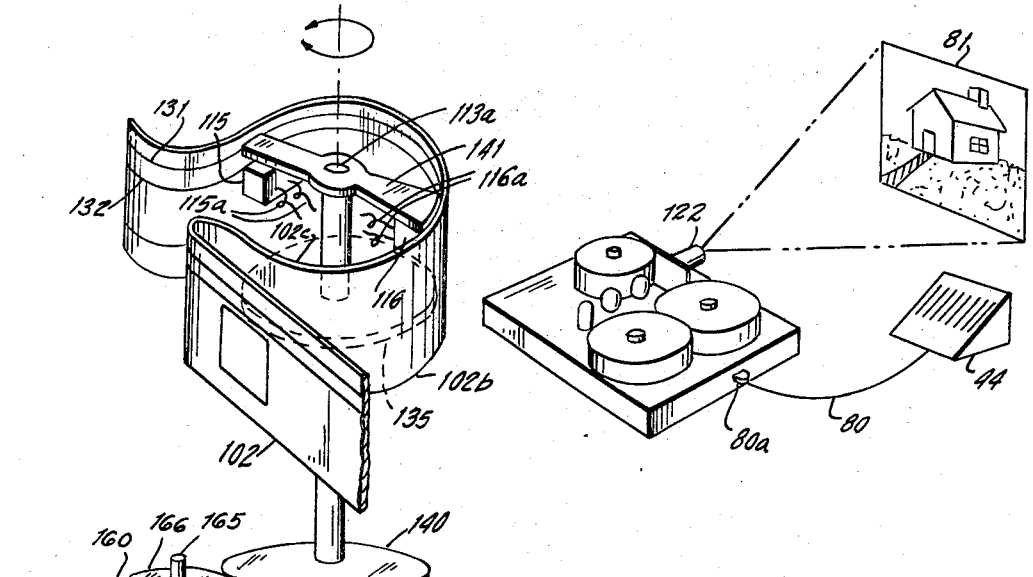
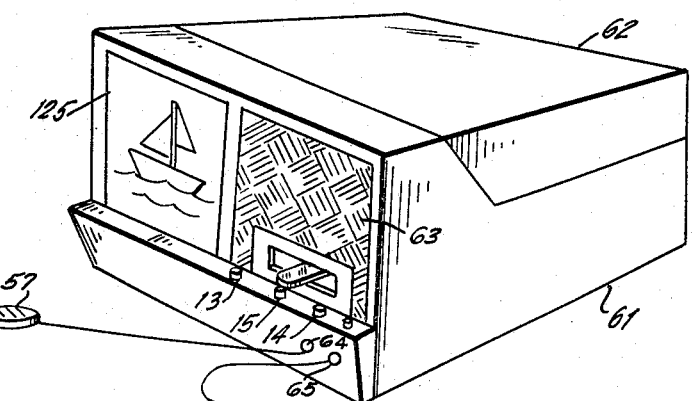
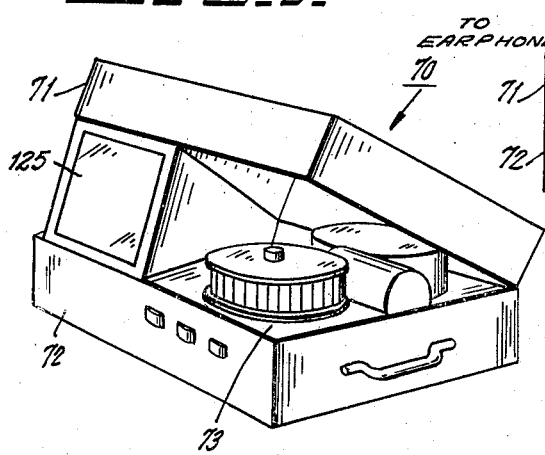
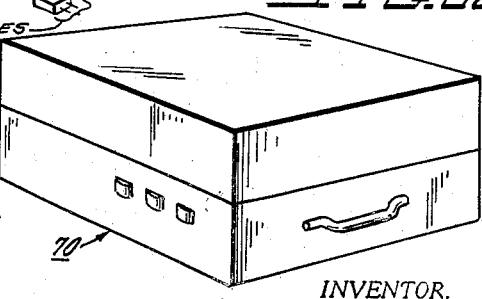
INVENTOR.
WALLACE W. WARD
BY
OSTROLENK, FABER, GERB & SOFFEN
ATTORNEYS Jan. 27, 1970  W. W. WARD  3,491,462
AUDIO-VISUAL TEACHING MACHINE
Filed March 6, 1967  5 Sheets-Sheet 4

INVENTOR.
WALLACE W. WARD

OSTROLENK, FABER, GERB & SOFFEN
ATTORNEYS

Jan. 27, 1970   W. W. WARD   3,491,462
AUDIO-VISUAL TEACHING MACHINE
Filed March 6, 1967   5 Sheets-Sheet 5

INVENTOR.
WALLACE W. WARD
BY
OSTROLENK, FABER, GERB & SOFFEN
ATTORNEYS

United States Patent Office 3,491,462
Patented Jan. 27, 1970

3,491,462
AUDIO-VISUAL TEACHING MACHINE
Wallace W. Ward, 28 Long Hill Lane,
Chatham Township, N.J. 07928
Filed Mar. 6, 1967, Ser. No. 620,921
Int. Cl. G09b 5/06; G03b 23/02
U.S. Cl. 35—35                  10 Claims

ABSTRACT OF THE DISCLOSURE

This invention teaches a combined audio-visual aid employing a film strip having at least one sound track for recording and/or playback and having frames arranged at spaced intervals along the film strip which are associated with predetermined sections of the sound track. The hardware is comprised of means for holding the film strip within the assembly in a loop fashion to permit indefinite playback and/or recording without any necessity for moving the film strip, thereby enabling the frame being projected to be viewed continuously regardless of the number of repeated recording and/or playback operations. A second sound track may be provided so that the first track may be allocated to a master's voice and the second sound track allocated to a student's voice. The master's sound track may only be operated for playback. The student's sound track may be used for either recording or playback. Both sound tracks permit repeat operations to be continued indefinitely while the film strip remains stationary through all such repeated operations, thereby enabling continuous observation of the frame associated with the sound track sections located in the operative position.

---

The instant invention relates to teaching machines, and more particularly to an audio-visual teaching apparatus which provides a visual display of subject matter related to the subject being taught, and further provides substantially infinite repeat play of a master or teacher's voice and substantially infinite repeat play of a student's voice channel to permit the studend to listen to the teacher's voice as many times as is desired without requiring any backup of the recording medium, and to record and listen to his own voice as many times as is desired, likewise without requiring any backup of the recording medium.

A large variety of teaching machines are presently available which are adapted to facilitate the learning process of a student through a variety of methods. For example, one teaching machine may be totally comprised of reading material arranged in a predetermined pattern either in a book or within a machine to guide the student through a predetermined format so as to achieve a predetermined learning process. Other programmed teaching devices employ sound and/or pictorial displays to facilitate the learning process. Teaching apparatus and other educational aids which employ audio-visual techniques have been found to be the most successful devices for facilitating the student's learning process. However, all conventional devices presently available have many disadvantageous features. For example, let it be assumed that it is desired to provide a teaching machine employing audio-visual techniques for the purpose of teaching a language to the student. The visual apparatus may be comprised of a display showing a scene and/or words in the language being taught, which is projected upon any suitable screen. The preferred audio technique may be comprised of a recording medium having a sound track in which the teacher's or master's voice is recorded and may be played back so as to provide the student with an invaluable aid as to the pronunciation of the words which are visually displayed upon a screen. Since pronunciation is usually quite difficult to learn, it is extremely advantageous to provide means to enable a student to replay the teacher's voice a plurality of times in order to enable a student to master correct pronunciation. Using conventional techniques, this requires a rewind operation which typically consists of stopping the recording medium, rewinding the recording medium back to the starting point for the particular word, words or phrase being listened to, and playing back the desired word or group of words which the student wishes to hear for a second time. This is a rather tedious procedure, and further requires some high degree of ability in relocating the starting point for the word or group of words which the student wishes to replay, particularly if disc records are used. Electronic circuits which automatically achieve such a result are quite expensive and sophisticated. Also, if the recording medium containing the teacher's voice likewise contains the visual material to be displayed, the replay operation causes an interruption in the continual display of the visual material. In accordance with conventional techniques, this problem may be overcome only by providing separate media for the audio and visual material, and consequently, separate projection and recording instruments for the two media, thereby greatly complicating the teaching machine apparatus.

The instant invention provides a teaching machine in which both the audio and visual material are provided on a single recording medium handled by a single apparatus having integrated therein both record-playback instrumentation and visual display means wherein the visual display is never interrupted during playback of either the master's voice or the student's voice, as well as during recording of the student's voice. In addition thereto, repeated playback may be initiated without any rewind operation of the recording medium.

The instant invention is comprised of a novel recording medium which substantially resembles conventional film strips wherein a substantially major portion of the film strip is provided with a plurality of frames of projectable material arranged at spaced intervals along the film strip. Sound recording tracks are arranged in spaced parallel fashion, preferably along one edge of the film strip such that the sound recording associated with a particular frame is arranged a predetermined distance from its associated frame in either a forward or a rearward direction.

The novel film strip is placed in an audio-visual apparatus having a take-up spool arranged to receive the forward end of the film strip and a supply reel spindle for receiving the supply reel about which the film strip is wound. The film strip is inserted in the machine by placing the supply reel upon the supply reel spindle and threading the film strip around an advancing sprocket; around a scanning drum of revolving scanning heads having a plurality of reading heads therein and arranged about the exterior of the scanning drum and circumferentially surrounding the scanning heads; and thence to a take-up reel.

A suitable projecting apparatus comprised of a light source and a condensing and objective lens system is arranged at a position located between the scanning drum and either the supply or take-up reel position so as to project at least one frame upon a suitable viewing screen.

The scanning drum and suitable guide rollers cooperate to align the film strip about the scanning drum so as to conform substantially to a complete circle. The frames to be visually displayed and their associated recording tracks are positioned relative to one another upon the film strip so that the teacher's recorded and the student's recording track are in alignment with the projection system for projection thereof.

The magnetic heads are rotatably mounted so as to revolve about the longitudinal axis of the scanning drum in order to scan their associated recording tracks. Record and playback means are provided, together with switch means, to enable only playback of the teacher's voice in a first switch position and to provide either erasure and recording of the student's track, or playback of the student's track when the switch is moved to either the erase-record and the playback student's voice switch positions, respectively.

In one preferred embodiment, the magnetic heads rotate continuously in the play position. The drum moves with the film strip and in the direction of movement of the film strip during advance and rewind functions. Since the recording media (i.e., film strip) remains completely stationary during the playback operation, the film strip is thereby automatically pre-positioned for an infinite number of repeat playback operations of the sound recording, if desired.

Once the student is satisfied that he has grasped the pronunciation of a word or words through listening to the teacher's voice, he may record his own voice by depressing an erase-record-student push-button which connects the magnetic head associated with the student's recording track to the recording means to enable the student to record his own voice within the student's recording track.

Once the student has recorded his voice within the student's recording track, he may now desire to listen to his own recorded voice and compare it with the teacher's recorded voice. This may be done by depressing a suitable push-button means which couples the magnetic head associated with the student's recording track to suitable playback means, and simultaneously therewith, since the film strip remains completely stationary throughout the entire procedure, as was previously described, the student's recording track is thereby automatically pre-positioned for the playback operation, and the student may thereby listen to his own recorded voice without performing any rewind operation of the film strip.

All of the above operations may be repeated effectively an infinite number of times with great ease, due to the fact that the recording medium remains absolutely stationary during the performance of these functions, while the recording heads are revolved. In addition thereto, the projected frame is constantly portrayed on the viewing screen without interruption regardless of the number of recording and playback functions which are performed. Since picture and sound are on the same media, loss of continuity or synchronization is impossible.

Once a student is satisfied that he has mastered the understanding and pronunciation of a word or group of words associated with the frame being projected, an advance push-button may be depressed, thereby causing the film strip to be advanced to the next frame. Suitable keying means are provided for automatically locking the next frame into the projection position. The predetermined arrangement of frames and associated recording tracks automatically assures exact alignment of the associated student and teacher recording tracks within the scanning area. This arrangement thereby greatly simplifies the manipulation of the audio-visual teaching machine by the student so that the student may direct his major effort toward learning the subject matter provided in the recording medium without being unduly burdened with the manipulation of a complex teaching machine.

It is, therefore, one object of the instant invention to provide a novel teaching machine which employs a single recording medium containing both audio and visual information.

Another object of the instant invention is to provide a novel teaching machine employing a recording medium containing both audio and visual information wherein the visual information is comprised of a plurality of frames arranged at spaced intervals along the recording medium, and wherein the audio information is comprised of at least one recording track arranged adjacent one edge of the recording medium with the recorded material associated with each frame being positioned at a predetermined location along the recording medium relative to its associated frame.

Another object of the instant invention is to provide a novel audio-visual teaching apparatus for use with a single recording medium containing both audio and visual information wherein the apparatus is comprised of a scanning drum for receiving the recording medium and positioning the recording medium in a substantially circular manner and having at least one revolving magnetic head revolving within the scanning drum to scan a recording track, and being further provided with projection means for projecting the frame associated with the recording track positioned within the scanning drum wherein the frame is projected upon a suitable viewing screen.

Another object of the instant invention is to provide a novel audio-visual teaching apparatus for use with a single recording medium containing both audio and visual information wherein the apparatus is comprised of a scanning drum for receiving the recording medium and positioning the recording medium in a substantially circular manner and having at least one revolving magnetic head revolving within the scanning drum to scan a recording track, and being further provided with projection means for projecting the frame associated with the recording track positioned within the scanning drum wherein the frame is projected upon a suitable viewing screen, and further wherein said rotating scanning head moves along a circular path adjacent the circularly positioned film strip so as to enable repeated playback operations without any necessity for rewinding the recording medium.

These and other objects of the instant invention will become apparent when reading the accompanying description and drawings, in which:

FIGURE 1 is a plan view of an audio-visual teaching machine designed in accordance with the principles of the instant invention.

FIGURE 2 is a plan view showing the configuration of the film strip employed in the instant invention.

FIGURE 3 is a perspective view showing the record heads recording medium and record head drive mechanism in greater detail.

FIGURES 4 through 6 are perspective views showing console, portable and group instruction embodiments in which the instant invention may be housed.

FIGURE 8 is a perspective view showing the magnetic record and playback assembly of FIGURE 3 in greater detail.

Figure 7:
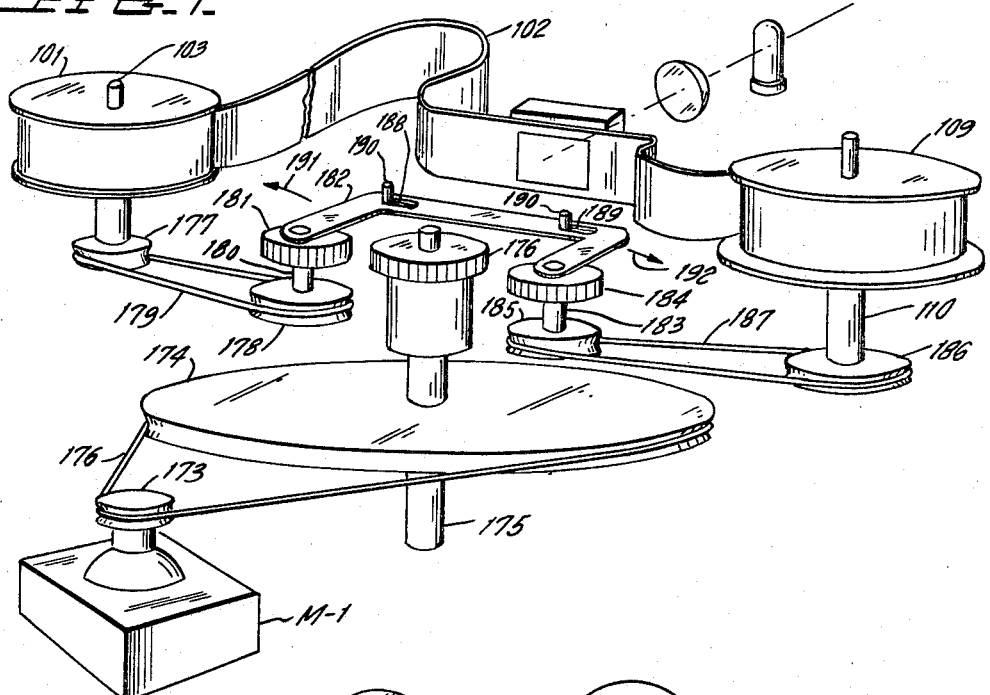
FIGURE 7 is a perspective view showing the film strip advance-rewind mechanism.
Figure 7A:
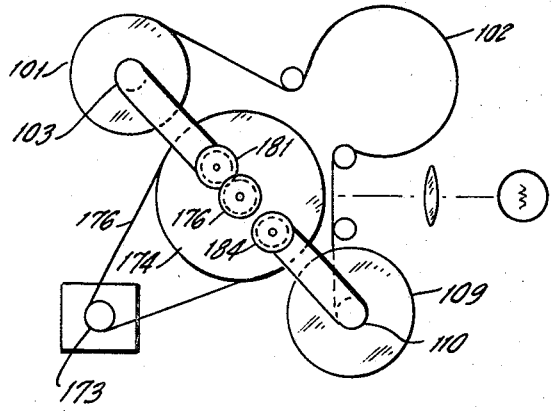
FIGURES 7a and 7b are top plan views of the film advance-rewind mechanism shown in the advance and rewind positions, respectively.
Figure 7B:
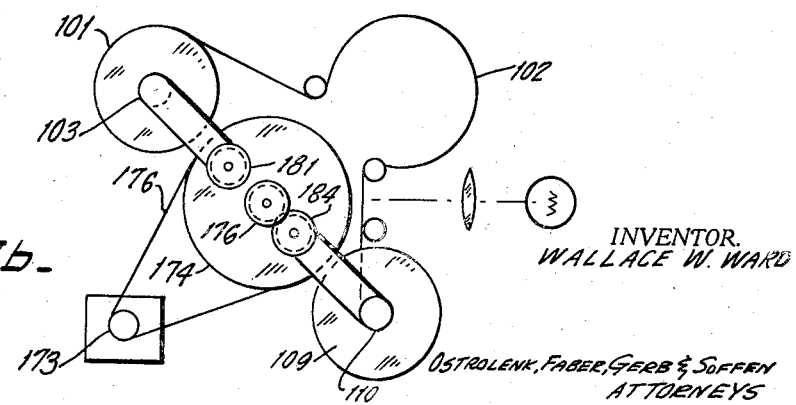

Referring now to the drawings, and more particularly to FIGURE 1, there is shown therein an audio-visual teaching machine 100 comprised of a supply reel 101 having a film strip 102 would thereon. The supply reel 101 is mounted upon a suitable supply reel spindle 103 driven by motor means $M_1$ which is shown mechanically coupled thereto by dashed line 104. The film strip 102 is taken off the supply reel from the outer end thereof and wound about a first rotatably mounted guide roller 105, a scanning drum 106, a second rotatably mounted guide roller 107 and a rotatably driven sprocket 108, to a takeup reel 109 mounted upon takeup spindle 110 which is driven by motor means $M_1$ mechanically coupled thereto as represented by the dashed line 111.

The rotatably driven sprocket wheel 108 is mechanically coupled through 112 to motor means $M_1$.

The scanning assembly 106 is mechanically driven by a motor means $M_2$ (or through suitable clutch means to motor $M_1$) for the purpose of moving the magnetic heads 115 and 116 relative to the recording tracks in a manner to be more fully described.

Mounted between the guide roller 107 and the sprocket wheel 108 is a projection system 117 comprised of an energizable light source 118 whose light, when energized, is reflected by reflector means 119 toward the left through the condensing lens system 120 so as to pass through an image aperture (to be more fully described) positioned at 121. The light rays passing through the image aperature positioned at 121 subsequently pass through an objective lens system 122. These rays 123 are reflected from a mirror surface 124 so as to strike the surface of a back-lighted screen 125 to project the image positioned at 121.

The film strip 102 of FIGURE 1 is shown in more detail in FIGURE 2. The film strip 102 is comprised of a substrate 102a of any applicable material which contains a plurality of single frame images 126–128 arranged at spaced intervals along the substrate. These projectable images may be a printed image positioned upon suitable apertures provided in substrate 102a, or they may be a photographic diazo, an electrostatic image, or any other suitable form. A plurality of sprocket holes 129 may be provided, which holes are arranged at spaced intervals substantially along a straight line which is substantially parallel to the lower edge 102b of substrate 102a. These sprocket holes cooperate with the sprocket wheel 108 for accurate advancement of the film strip in a manner to be more fully described. Obviously, sprocket holes may be provided along the upper edge of strip 102, if desired. A plurality of automatic stop perforations 130 are arranged at spaced intervals substantially along a straight line which is parallel to the lower edge 102b of the film strip.

A pair of sound tracks 131 and 132, preferably of a magnetic medium, are arranged in spaced parallel fashion adjacent the upper edge 102c of the film tracks to cooperate with the magnetic record-playback heads 116 and 115 of FIGURE 1 in a manner to be more fully described.

The visually projectable images, and the sound tracks are so arranged that a predetermined section of the sound tracks 131 and 132 are associated with a predetermined one of the visually observable images. For example, the section D of sound tracks 131 and 132 may be associated with the visual image 126. In a like manner, succeeding sections of sound tracks 131 and 132 are arranged so that their associated visually observable images are positionend forward of the sound track sections, wherein the forward direction of FIGURE 2 is shown by arrow 133. This relationship can be best understood from a consideration of FIGURE 1 wherein it can be seen that, with the film strip being driven in the direction shown by arrow 133, the sound tracks for the visual image located at 121 will be accurately positioned within the confines of the cylindrically shaped scanning drum 106. If desired, by positioning the projection means within the scanning drum, the recording media may be immediately adjacent its associated frame.

In order to maintain the film strip taut during the scanning operation, the scanning assembly 106 (see FIGURE 8) is comprised of a stiffening drum 135 having an outwardly projecting portion forming a ledge 150 for positioning and supporting the lower edge of film strip 102. As can best be seen in FIGURE 8, the film strip is wound about the exterior surface of drum 135. In order to maintain the film strip taut against the surface of drum 135, the mechanism is provided with a brake band 151, shown best in FIGURES 8a and 8b. The brake band is secured to a post 152 at one end thereof and surrounds a major portion of the stiffening drum 135. The opposite end of the brake band is wound about a second post 153 in a helical manner. A lever 154 is rigidly secured to post 153, and bias means 155 urges the brake band clockwise, as shown by arrow 156, so as to be drawn against the film strip which is maintained taut against the outer surface of the stiffening drum. Movement of lever 154 in the direction shown by arrow 156 rotates the brake band counterclockwise about post 153 so as to release tension from the film strip for threading, removing and advancing functions in a manner to be more fully described.

The record-playback assembly is further comprised of a disc 158 mounted to rotate with shaft 113a and having secured at diametrically opposed positions along the underside of disc 158 a pair of magnetic heads 115 and 116 (only one of which is shown in FIGURE 8).

Figure 8A:
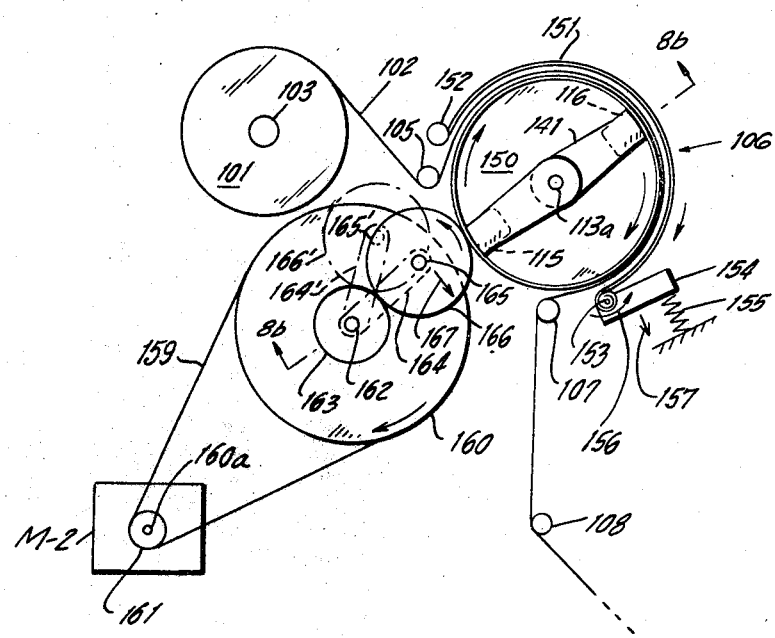
FIGURE 8a is a top plan view of the magnetic record-playback assembly of FIGURE 8.

Considering the embodiment of FIGURE 8a, the motor means $M_2$ is coupled through a belt drive 159 to a fly-wheel 160, the belt drive surrounding the fly-wheel 161 of motor $M_2$ and the periphery of fly-wheel 160. Fly-wheel 160 is rigidly coupled to shaft 162 which, in turn, has wheel 163 secured to a shaft at its upper end. Shaft 162 also pivotally mounts one end of a lever arm 164, the opposite end of which rotatably supports shaft 165 having an idler roller 166 secured at its upper end. Rotation of the magnetic heads occurs in the following manner:

Motor $M_2$ may be continuously energized with energization of the audio-visual projection means. However, for rotation of the magnetic head assemblies, the idler, which is normally maintained in the disengaged position 166' shown in FIGURE 8a, is moved in the direction shown by arrow 167 into the solid line position so as to make rolling engagement with disc 140 as well as with roller 163 and hence drive shaft 160a (see FIGURE 8b).

Figure 8B:
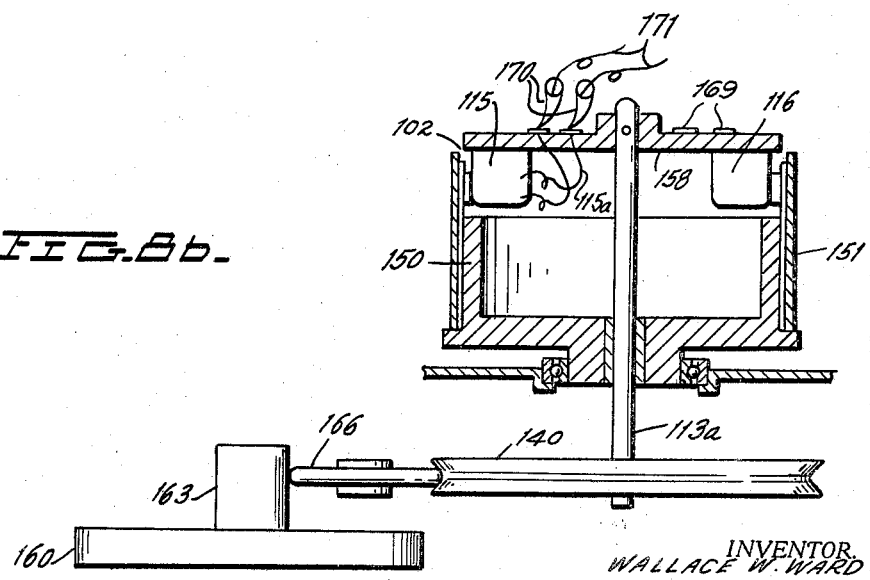
FIGURE 8b is an elevational sectional view of a portion of the record-playback assembly of FIGURE 8.

With the idler in the operative position, the drive roller 160 rotates shaft 160a which, in turn, rotates disc 140, which rotates shaft 113a thereby causing the two magnetic heads to move relative to the recording tracks 131 and 132 (see FIGURE 2, for example) for the purpose of playback of these tracks (or recording in the student's record track). In FIGURES 3 and 8, the belt drive 159 (of FIGURES 8a and 8b) is omitted and disc 160 is directly mounted upon shaft 160a. Idler 166 is coupled to lever 164 (not shown in FIGURE 3) by means of shaft 165.

The magnetic heads have their output leads 115a and 116a (see FIGURE 8b) electrically coupled to commutator rings 169 which cooperate with a plurality of pickup brushes 170 mounted to suitable terminal means 171 for electrically coupling recording signals into and playback signals out from the magnetic heads. The lever arm 164 (see FIGURE 8a) is preferably mechanically coupled to relay means (not shown) which through a suitable mechanical linkage (which may include a suitable mechanical advantage mechanism) moves the lever arm 164 between the idle and operative positions and which may be energized by depression of either the record or playback or instructor push-button provided upon the audio-visual unit console, as shown in FIGURE 2. The magnetic heads 115 and 116 are arranged so as to pick up (or record) from only one of the recording tracks. This may simply be done by arranging the magnetic heads to depend downwardly from disc 158 by different amounts.

Film advance and film rewind operation

Let it be assumed that the use of the image positioned in image aperture 121 is completed and that the operator (i.e., student) desires to advance to the next image.

The advance-rewind assembly can best be seen in FIG-

URES 7 through 7b. The motor means $M_1$ has a roller 173 coupled to its shaft which operates fly-wheel 174 mounted upon shaft 175 through a belt drive 176 of the same type previously described with reference to FIGURE 8a. Shaft 175 is rigidly coupled to the flywheel 174 and gear means 176. Thus, energization of motor $M_1$ causes rotation of gear 176.

The reel 101 is mounted upon the spindle 103 which is coupled to a V-grooved roller 177 at the lower end thereof. Roller 177 is driven by a second roller 178 through expansible belt drive 179. Roller 178 is rigidly secured to shaft 180 whose upper end has secured thereto gear means 181. Shaft 180 is journaled to rotate at one end of shift lever 182. The opposite arm of shift lever 182 rotatably receives a shaft 183 whose upper end has secured thereto gear 184 and whose lower end thereof has secured thereto roller 185. Roller 185 drives a second V-grooved roller 186 through belt drive 187. Roller 186 is coupled to spindle 110 which, in turn, drives take-up reel 109.

To further drive take-up reel 109 for a film advance, the shift lever 182 which is provided with two elongated slots 188 and 189, is moved in the direction shown by arrow 191, causing gear 184 to mesh with gear 176. The guide pins 190 act to limit the movement of shift lever 182 along a substantially straight line.

With gears 176 and 184, meshed, shaft 183 rotates imparting rotation to roller 185 which conveys rotation to roller 186 and spindle 110 through belt drive 187, in turn, rotating take-up reel 109. Since belt drive 187 is formed of an expansible belt material, tensioning of the belt does not affect the drive means, and likewise disengagement of gear 184 with gear 176 does not cause removal of belt drive 187 from rollers 185 and 186 since a sufficient amount of tension still remains in a disengaged position to maintain the belt drive 187 in its operative position about the rollers.

For the rewind operation, shift lever 182 is moved in the direction shown by arrow 192, causing gears 176 and 181 to mesh. In a similar manner, the meshing of these gears couples rotation through shaft 180, roller 178, belt drive 179, roller 177 and spindle 103 to supply reel 101, and thereby perform a rewind operation.

The energization of motor $M_1$ continues until the automatic stop switch 20, shown in FIGURE 1, becomes activated. The automatic stop switch 20 is comprised of a first contact surface 21 electrically connected to ground potential 18. The other contact 22 is a feeler contact which makes engagement with stationary contact surface 21 through one of the automatic stop perforations 130 provided in the film strip, as can best be seen in FIGURE 2. As soon as the film contact feeler 22 makes engagement with stationary contact surface 21 through the stop aperture, a current path is completed for relay $R_1$ causing the relay to become energized, and thereby moving its normally closed contacts $C_1$ to their open position so as to deenergize motor $M_1$. This arrangement precisely aligns the next image at the image aperture location 121, and simultaneously therewith precisely positions its associated recording track sections within scanning drum assembly 106.

In order to advance the film strip for the second time, the operation is repeated simply by operating the advance switch 11 to reenergize the motor $M_1$. Automatic stop switch 20 can be moved to the open position by allowing the motors to glide to a stop upon deenergization so as to move a stop aperture slightly away from a position between the contacts 21 and 22. Accurate positioning of the film strip is performed by means of the sprocket 108, shown in FIGURE 1. A disc 26 is provided on sprocket 108 with a plurality of notches 26a arranged around its periphery for selective engagement with a stop pin 27 urged into engagement with the periphery of disc 26 by a suitable spring means (not shown). The closure of switch 20 energizes relay $R_1$ which mechanically operates stop pin 27, as indicated by the dashed line 29, to withdraw from a notch upon initiation of a film advance operation. As the motors, upon deenergization, glide to a stop, the stop pin 27 enters a notch in disc 26, thereby accurately positioning an image in the image projection operation.

Record and playback operation

Let it now be assumed that the desired image is positioned in the image aperture location 121 (see FIGURE 1) displaying some image upon the back-lighted screen 125. Let it further be assumed that the user (i.e., student) now desires to listen to the recorded material associated with the image being displayed. Motor $M_1$ is continuously energized with turn-on of the machine. The instructor's sound track may be played out by depressing switch 13 (FIGURE 4) which is mechanically coupled to switch arm 164, shown in FIGURE 8a. This operation moves idler 165 into operative engagement with capstan 163 and driven disc 106. The projection system light source is energized so as to project the image located with image aperture 121 upon back-lighted (or other suitable) screen 125. The rotation of roller 166 drives disc 158 and heads 115 and 116 into rotation.

The output of the magnetic tape head 115 is coupled to a playback amplifier (not shown) through commutator rings 169 and brushes 170 (see FIGURE 8b). The energization of motor $M_1$ drives cylinder 158 of FIGURE 8b into rotation, causing magnetic head 115 to pick up the magnetic recording in sound track 131 which is amplified so as to be played out by a loud speaker (not shown).

Continuous repetition of the instructor's voice will be maintained until the instructor push-button is released.

Let it now be assumed that the student has grasped the material being visually displayed and the material recorded in the teacher's sound track to a degree sufficient to attempt pronunciation of the word, words or phrase contained within the teacher's sound track. The record operation is initiated by depressing a record push-button 15, which again places the idler 165 in the solid line position shown in FIGURE 8a. Suitable circuitry (not shown) operatively connects a microphone and amplifier (through the appropriate commutator rings) to the record head 116. Recording is performed by speaking into the microphone (not shown) which, through a record-amplifier (not shown), activates record-playback head 16 to record the student's voice in sound track 132.

Let it now be assumed that the student has recorded his voice in the student record-playback sound track 132 and now desires to listen to his recorded voice. This is done by manipulating switch 14 so as to couple the student's record-playback head 16 to a playback amplifier (not shown). The student's voice is played back through the loud speaker.

If the student is dissatisfied with his pronunciation, a second record operation may be performed simply by depressing the record push-button 15 to initiate a second record operation. It should be noted that as many repeat record operation may be performed as the student desires.

If the student desires to compare his own pronunciation with the pronunciation of the teacher, this may simply be done by positioning switch 14 to play back the student's recording by coupling head 16 to switch 14 and then depressing playback button 13. Upon completion of this playback operation, push-button 14 may then be positioned to couple the teacher's playback head 115 to playback amplifier 43. The playback push-button 13 is then depressed to initiate playback of the teacher's recorded voice. It should be noted that the student's sound track 132 is the only sound track which may be erased (i.e., by virtue of performing a recording operation). Thus, there is no way of either accidentally or deliberately erasing the teacher's recording.

The length of the recording or playback tracks may be increased by increasing the diameter of the scanning drum to permit the recording or playback of longer messages. Such embodiments would be dependent only upon the needs of the user.

FIGURE 4 shows a console embodiment in which the audio-visual teaching aid of FIGURES 1 through 4 and 7 through 8b may be mounted. The console 60 is comprised of a housing 61 having a pivotally mounted lid 62 for the purpose of inserting or removing a film strip. The back-lighted screen 125 is shown at the left of the front face of the console. The control push-buttons are located at the front face of the console immediately below a screen 63 behind which the speaker 44 (see FIGURE 6) is mounted. A jack 64 is provided for plugging in the microphone 57. A second jack 65 is provided for plugging in an earphone cord 66 in place of the speaker 44 when it is desired to avoid any conflict of usage of the device 60 with activities that others in the room may be engaged in.

If desired, the audio-visual teaching device may be produced as a portable unit, as shown in FIGURES 5 and 5a. FIGURE 5a shows the attache case 70 containing the teaching device in the closed position. FIGURE 5 shows the lid 71 of the attache case lifted. A collapsible back-lighted screen 125 is shown in the upright position for use thereof. The controls may be mounted along the forward surface 72 of the case, or, if desired, may be mounted at location 73 inside the case.

FIGURE 6 shows an embodiment 80 which may be used for group instruction wherein the objective lens system 122 is arranged to project the image upon any suitable projection screen 81 which may be mounted upon a wall in the room in which group instruction takes place. A jack 80a is provided for coupling a speaker 44 thereto, which speaker may be located within the room in any suitable position so as to assure adequate transmission of the sound to the entire group.

It can be seen from the foregoing that the instant invention provides a novel audio-visual teaching aid in which single frames of visually observable images may be projected upon a screen and, simultaneously therewith, a teacher's voice may be played an infinite number of times so as to enable a student to listen to the teacher's voice reciting information associated with the projected image as often as is desired without any necessity for rewinding the film strip. In addition thereto, a student may record and/or play back his own voice as often as is desired without performing a rewind operation so as to facilitate the learning of pronunciation of the material comprising the lesson, wherein minimum concern need be given to the operation of the audio-visual teaching aid due to its simplicity. The information or lesson contained upon the film strip may be advanced by the student in a simple manner by means of a mechanism assuring accurate placement of the image to be displayed within the projection system while, simultaneously therewith, assuring accurate positioning of the sound tracks associated with the image being projected. A rewind operation need be performed only if it is desired to remove the film strip containing the lesson upon the supply reel. If desired, the entire film strip may be wound upon the takeup reel, and the film may then be rewound to the supply reel upon separate suitable rewind apparatus to enable use of the audio-visual teaching aid with a second film reel without having to perform a rewind operation of the first film reel within the teaching aid.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. Audio-visual aid means comprising:
    film strip means comprising an elongated tape having a plurality of images arranged at spaced intervals along said tape;
    at least one recording sound track arranged along said tape adjacent one edge thereof;
    take-up means;
    means for feeding said tape to be wound by said take-up means;
    projection means and playback means positioned rearwardly relative to said take-up means and being physically displaced from one another by a predetermined distance;
    said playback means being comprised of a hollow cylindrical drum;
    said tape being positioned about said drum;
    magnetic head means being positioned above said drum and being mounted to rotate about a center point substantially coincident with the longitudinal axis of said drum so as to follow a continuous closed circular path lying substantially in a single plane and arranged in close proximity to the section of the sound track enclosed within said drum;
    means for rotating said drum when said tape is held stationary to provide relative motion between said tape and said magnetic head means whereby said recorded information may be repetitively scanned by said magnetic head means without resetting said drum;
    means for reading out the recorded information in the sound track section positioned around said drum simultaneously with the projection of its associated image.

2. The device of claim 1, further comprising means for recording information upon the sound track section positioned within said drum.

3. The device of claim 1, wherein said tape is further provided with a second sound track arranged in spaced parallel fashion relative to said one sound track;
    said magnetic head means further comprising a first and second magnetic head each being arranged to rotate along first and second circular paths lying substantially within spaced parallel planes, which paths are in close proximity to the first and second sound tracks, respectively;
    said readout means further comprising combined record and readout means to enable both recording and readout from said second sound track.

4. The device of claim 1, wherein said magnetic head means is comprised of a rotatable shaft;
    an arm rigidly secured to said shaft at one end thereof and having said magnetic head mounted at the opposite end thereof, said magnetic head being movable through said circular path upon rotation of said shaft;
    motor means for driving said shaft.

5. The device of claim 4, further comprising switch means electrically connected to said motor means for normally energizing said motor means and for deenergizing said motor means when said magnetic head assembly completes one revolution.

6. The device of claim 1, wherein said film strip is further provided with automatic stop marks comprised of a plurality of apertures arranged at spaced intervals along said tape;
    said feeding means comprising motor means for advancing said tape;
    switch means electrically connected to said motor means for normally energizing said motor means and for deenergizing said motor means when said switch means engages an automatic stop mark.

7. An audio-visual aid for use with a film strip comprising:
    an elongated tape;
    a plurality of projectable images arranged at spaced intervals along said tape; each of said images portraying differing subject matter;

at least one sound track arranged along said tape adjacent one edge thereof; said sound track being divided into a plurality of sections;

each of said sections containing recorded information specifically related to an associated one of said images;

each of said sections of sound track being located a spaced longitudinal distance from its associated image;

said audio-visual aid comprising:

a supply reel assembly for said film strip;

a take-up reel assembly for said film strip;

still projection means for projecting the images on said film strip positioned intermediate said supply and take-up reel assemblies;

a magnetic playback means including a rotatable drum and being positioned a spaced distance from said projection means and intermediate said supply and take-up reel assemblies;

said film strip being positioned around the exterior surface of said drum and through said projection means;

said playback means having a shaft; a first magnetic head assembly positioned above said drum and being mounted to rotate with said shaft and being positioned adjacent said one sound track;

motor means for rotating said shaft causing said magnetic assembly to describe a circular path which lies within a single plane and is adjacent said one sound track for playback of the information stored in the section of said sound track surrounding said drum whereby said recorded information may be repetitively scanned by said magnetic head means without resetting said drum;

said projection means and said drum being positioned so as to permit playback of the information associated with the image being projected.

8. The device of claim 7, wherein said film strip is further provided with automatic stop marks comprised of a plurality of apertures arranged at spaced intervals along said tape;

second motor means for advancing said tape;

switch means electrically connected to said second motor means for normally energizing the second motor means and for deenergizing said motor means when said switch means engages an automatic stop mark.

9. The device of claim 7, wherein said film strip is further provided with a second sound track arranged in spaced parallel fashion relative to said first sound track; a magnetic record and playback assembly comprising a second magnetic head assembly mounted for rotation to said shaft and positioned adjacent said second sound track for describing a second circular path adjacent said second sound track.

10. The device of claim 7, further comprising switch means electrically connected to said motor means for normally energizing said motor means and for deenergizing said motor means when said magnetic head assembly completes one revolution.

References Cited

UNITED STATES PATENTS 3,365,817   1/1968   MacFarlane _____ 35—35.3

FOREIGN PATENTS 1,027,828   4/1966   Great Britain.

LAWRENCE CHARLES, Primary Examiner

U.S. Cl. X.R.

353—105